(12) United States Patent
Passler

(10) Patent No.: US 11,782,170 B1
(45) Date of Patent: Oct. 10, 2023

(54) LOCATION OF A MOVING TARGET WITH ROUND TRIP TIME VECTORS USING AN AIRBORNE PLATFORM

(71) Applicant: SR Technologies, Inc., Sunrise, FL (US)

(72) Inventor: Mark Passler, Boca Raton, FL (US)

(73) Assignee: SR Technologies, Inc., Sunrise, FL (US)

( * ) Notice: Subject to any disclaimer, the term of this patent is extended or adjusted under 35 U.S.C. 154(b) by 0 days.

(21) Appl. No.: 17/885,102

(22) Filed: Aug. 10, 2022

Related U.S. Application Data

(60) Provisional application No. 63/331,019, filed on Apr. 14, 2022.

(51) Int. Cl.
  *H04W 64/00* (2009.01)
  *G01S 13/87* (2006.01)
  *G01S 19/11* (2010.01)
  *G01S 19/47* (2010.01)

(52) U.S. Cl.
  CPC ............ *G01S 19/47* (2013.01); *G01S 13/878* (2013.01); *G01S 19/115* (2019.08); *H04W 64/00* (2013.01)

(58) Field of Classification Search
  CPC ...... G01S 19/47; G01S 19/115; G01S 13/878; H04W 64/00
  See application file for complete search history.

(56) References Cited

U.S. PATENT DOCUMENTS

| | | | |
|---|---|---|---|
| 10,531,240 B1* | 1/2020 | Sciancalepore | H04B 17/364 |
| 2014/0097988 A1* | 4/2014 | Beauregard | G01S 11/04 |
| | | | 342/461 |
| 2014/0194137 A1* | 7/2014 | Do | H04W 24/00 |
| | | | 455/456.1 |
| 2022/0264257 A1* | 8/2022 | Hofmann | G01S 5/0249 |

* cited by examiner

*Primary Examiner* — Muthuswamy G Manoharan
(74) *Attorney, Agent, or Firm* — Christopher & Weisberg, P.A.

(57) ABSTRACT

A method and devices are disclosed that locate a target station moving at a constant velocity. A method and devices are disclosed for producing an RTT vector that is based upon the changes in position of the airborne measuring station position and the relative change in position of the target station. In one embodiment, the target station is an access point or station conforming to the IEEE 802.11 Standard and the airborne measuring station may also be a device that conforms to the IEEE 802.11 Standard.

16 Claims, 10 Drawing Sheets

LOCATION OF A MOVING TARGET WITH ROUND TRIP TIME VECTORS USING AN AIRBORNE PLATFORM

CROSS-REFERENCE TO RELATED APPLICATION

This application is related to and claims priority to U.S. Provisional Patent Application Ser. No. 63/331,019, filed Apr. 14, 2022, entitled LOCATION OF A MOVING TARGET WITH ROUND TRIP TIME VECTORS USING AN AIRBORNE PLATFORM, the entirety of which is incorporated herein by reference.

TECHNICAL FIELD

The present disclosure relates to the geo-location of wireless devices and in particular to a method and system for the geo-location of wireless local area network (WLAN) devices.

BACKGROUND

Initially, it is noted that IEEE Standard 802.11-2020 is used as the base reference for disclosures used in this disclosure, the entire contents of which are incorporated herein by reference. The IEEE 802.11 Standard is commonly referred to as "Wi-Fi".

Determining the location of wireless devices can be performed by various methods. These methods may be classified as active, passive and combined active and passive. In an active location scheme, a device that is determining the location or range, "the measuring device", transmits certain packets to the device being located, "the target device", and the common method is to measure the time of arrival (TOA) of the response from the target device and compare that to the time of departure (TOD) of the packet that was transmitted by the measuring device to determine the time for the round trip, RTT.

In such location systems it is common to use multiple measuring devices to determine the location. In such a scheme, simultaneous TOA and/or TOD measurements are taken by different measuring devices situated at different points and the location of the target device calculated.

In an active location scheme, TOD may be measured for a packet that is transmitted from the measuring station addressed to the target station. The TOA of the response from the target station at the measuring station is then also measured. If the turnaround time for the target station to receive the packet from the measuring station and to start to transmit the response is known, then the time difference at the measuring station between the TOA and the TOD, minus the turnaround time at the target station will be directly proportional to twice the distance of the target station from the measuring station. For example, if the target station is a wireless device based upon IEEE 802.11 technology, and if the packet transmitted from the measuring station to the target station is a data packet, the response from the target station will normally be an acknowledgement (ACK) packet. If the packet transmitted from the measuring station to the target station is a control packet, for example a request-to-send (RTS) packet, then the response from the target station will normally be a clear-to-send (CTS) packet. In these two examples, the turnaround time at the target station is defined in the IEEE 802.11 Standard as the short interframe spacing (SIFS), which is a preset value. Hence, the round trip time, RTT, between the measuring station and the target station may be determined from the calculation RTT=(TOA−TOD−SIFS) and the distance between the measuring station and the target station is then TDD*c/2, where c is the speed of light. This method of estimating the distance to a target station by measuring the TOD and TOA and accounting for the turnaround time is known.

FIG. 1 is a diagram of a typical location system 100 which includes three airborne measuring stations 110a, 110b and 110c (referred to collectively herein as "measuring stations" or "measuring receivers"). The target station 120 is a wireless device, for example an Access Point (AP) that is to be located by the three airborne measuring stations 110. The distance of the target station 120 from the airborne measuring station 110a is R1, 130. The distance of the target station 120 from the airborne measuring station 110b is R2, 140. The distance of the target station 120 from the airborne measuring station 110c is R3, 150. The round trip time, RTT1, determined from the calculation RTT=(TOA−TOD−SIFS), is measured for transmissions from the airborne measuring station 110a and used to calculate the distance R1 130 using the formula R1=RTT1*c/2 where c is the speed of light. Similarly, RTT2 and RTT3 measurements result in the determination of distances R2 140 and R3 150. The methods for calculating the location of the target station 120 using the distances R1 130, R2 140 and R3 150 are well known.

In cases where there is a single airborne measuring station 110, as may be the case when the station is airborne, then the three measuring distances R1 130, R2 140 and R3 150 may be taken at different points in time. Time is required in order for the airborne measuring station 110 to travel to the positions represented by 110a, 110b and 110c as shown in FIG. 1, to ensure angular intersections greater than 90 degrees which would result in an acceptable geometrical dilution of precision GDOP. Over time, the location of the target station 120 can be calculated with increasing accuracy as more measurements are taken by the airborne measuring station 110 from varying positions. Such calculations are well known, but there is a significant time delay before meaningful locations may result.

If, in order to obtain a faster location result, a directional antenna may be utilized at the single airborne measuring station 110, such that a direction may be known in addition to the distance to the target calculated from the RTT. FIG. 2 is a diagram of an airborne measuring station 110 that is transmitting a ranging signal to a target station 120. The range 210 of the target station 120 from the airborne measuring station 110, R 210, may be estimated from the RTT. If a directional antenna is deployed at the airborne measuring station 110, then the angle, Φ 220 of the direction of the received signal from the target station 120 can be measured. The location of the target station 120 can then be estimated as being a distance of D 210 from the airborne measuring station 110 along a vector that is at an angle of Φ 220 relative to the airborne measuring station 110. The accuracy of the estimated location will be dependent upon the directivity of the antenna at the airborne measuring station 110, and the accuracy of the RTT measurement.

The directivity of an antenna increases with the size and gain of the antenna. For example, an antenna with 5 degree beamwidth at 2.4 GHz may have dimensions in the order of 1.6 meters or 5.3 feet. Even with such a directivity, if the airborne measuring station 110 is airborne at an altitude of 10,000 feet and at a ground distance of 3 miles, then the ground location accuracy based solely upon the antenna angle of such a vector based location, as described in FIG. 2, would be in the order of ±1400 feet.

In order to measure an accurate location of the target station 120 from an airborne measuring station 110 within a time period of seconds, then the use of a directional antenna requires an antenna of large dimensions which may be impractical for mounting on the airborne platform. In addition, a directional antenna may need to be controlled in elevation and azimuth so as to point in the direction of the target station 120 resulting in complex circuitry and/or a gimballed antenna assembly.

Published U.S. Patent Application Nos. US2020/0158852 A1 and US2020/0166630 A1 both disclose methods and devices for producing an RTT vector that is based upon the change in an airborne measuring station position and the corresponding RTT results taken at known time intervals to a ground based target station. The disclosed methods can enable the location of a target station to a high accuracy within a period in the order of seconds. In both cases the methods rely on the condition that the target station is in a fixed location. In the case of a moving target station, the methods may become inaccurate.

SUMMARY

Some embodiments provide to a method and system for the geo-location of wireless local area network (WLAN) devices.

According to one aspect, a process in an airborne station for determining a location of a WD is provided. At each of a plurality of positions of the airborne station, at times $t_{n-q}$ for q=0 to q, the following are determined: the longitude $X_{n-q}$ and latitude, $Y_{n-q}$ of the airborne station; a round trip time RTT between the airborne station and the WD; and a distance, Rn, of the WD from the airborne station based on the determined longitude, latitude and RTT. The airborne station determines differences between earlier and later determinations of the latitude and longitude and differences (ΔRTTs) between earlier and later determinations of RTT. The airborne station scales the RTTs to account for horizontal distance and altitude of the airborne station. The airborne station minimizes residuals between the determined ΔRTTs and a model ΔRTT, the model ΔRTT being based at least in part on parameters α, $v_N$, and $v_E$ of the model, a being an angle between Rn and a reference axis, $v_N$ being a velocity of the WD in a first direction and $v_E$ being a velocity of the WD in a second direction perpendicular to the first direction. The airborne station determines a location of the WD based at least in part on a value for α that minimizes the residuals and based at least in part on the distance Rn.

According to this aspect, in some embodiments, the model ΔRTT is based at least in part on:

$$\Delta RTT = \left(\frac{2R_n}{C}\right)\left\{\sqrt{\left(1+\frac{d_{n-q\ para}}{Rn}\right)^2 + \left(\frac{d_{n-q\ perp}}{Rn}\right)^2} - 1\right\}1,$$

where $d_{n-q\ para}$=COS(α) $\Delta r_N$+SIN(α) $\Delta r_E$+[COS(α) $v_N$+SIN(α) $v_E$]*$(t_n-t_{n-q})$; |$d_{n-q\ perp}$|=|−SIN(α) $\Delta r_N$+COS(α) $\Delta r_E$+[−SIN(α) $v_N$+COS(α) $v_E$]*$(t_n-t_{n-q})$|; and $\Delta r_N$ is a change in latitude of the WD; $\Delta r_E$ is a change in longitude of the WD and C is a speed of light. In some embodiments, values of $v_N$ and $v_E$ that minimize the residuals are used to predict an average velocity v=$\sqrt{v_N^2+v_E^2}$ of WD and a future location of the WD. In some embodiments, the WD location is boxed by α±Δα, and by R±ΔR, where ΔR is related to an uncertainty in short interface spacing (SIFS) time and where α and Δα are derived from a correlation matrix based on the model. In some embodiments, the RTTs are scaled by a factor given by $$F = \frac{\sqrt{R_n^2 - Alt_n^2}}{R_n};$$

where $Alt_n$ is an altitude of the airborne station and $R_n$ is the range in the same units as the altitude. In some embodiments, the residuals are minimized based at least in part on minimizing a sum of squared residuals. In some embodiments, the process further includes scaling the longitude $X_{n-q}$ by COS ($Y_{n-q}$). In some embodiments, a measure of a final value of an RTT is based at least in part on an average of a number predetermined RTTs. In some embodiments, Rn is determined based at least in part on a delay that is determined when the WD is stationary. In some embodiments, the residuals are based at least in part on a horizontal distance between the WD and the airborne station.

According to another aspect, an airborne station for determining a location of a WD is provided. At each of a plurality of positions of the airborne station, at times $t_{n-q}$ for q=0 to q, the following are determined by the processing circuitry of the airborne station: the longitude $X_{n-q}$ and latitude, $Y_{n-q}$ of the airborne station; a round trip time RTT between the airborne station and the WD; and a distance, Rn, of the WD from the airborne station based on the determined longitude, latitude and RTT. The airborne station determines differences between earlier and later determinations of the latitude and longitude and differences (ΔRTTs) between earlier and later determinations of RTT. The airborne station scales the RTTs to account for horizontal distance and altitude of the airborne station. The airborne station minimizes residuals between the determined ΔRTTs and a model ΔRTT, the model ΔRTT being based at least in part on parameters α, $v_N$ and $v_E$ of the model, a being an angle between Rn and a reference axis, $v_N$ being a velocity of the WD in a first direction and $v_E$ being a velocity of the WD in a second direction perpendicular to the first direction. The airborne station determines a location of the WD based at least in part on a value for a that minimizes the residuals and based at least in part on the distance Rn.

According to this aspect, in some embodiments, the model ΔRTT is based at least in part on:

$$\Delta RTT = \left(\frac{2R_n}{C}\right)\left\{\sqrt{\left(1+\frac{d_{n-q\ para}}{Rn}\right)^2 + \left(\frac{d_{n-q\ perp}}{Rn}\right)^2} - 1\right\}1,$$

where $d_{n-q\ para}$=COS(α) $\Delta r_N$+SIN(α) $\Delta r_E$+[COS(α) $v_N$+SIN(α) $v_E$]*$(t_n-t_{n-q})$; |$d_{n-q\ perp}$|=|−SIN(α) $\Delta r_N$+COS(α) $\Delta r_E$+[−SIN(α) $v_N$+COS(α) $V_E$]*$(t_n-t_{n-q})$|; and $\Delta r_N$ is a change in latitude of the WD; $\Delta r_E$ is a change in longitude of the WD and C is a speed of light. In some embodiments, values of $v_N$ and $v_E$ that minimize the residuals are used to predict an average velocity v=$\sqrt{V_N^2+V_E^2}$ of WD and a future location of the WD. In some embodiments, the WD location is boxed by α±Δα, and by R±ΔR, where ΔR is related to an uncertainty in short interface spacing (SIFS) time and where α and Δα are derived from a correlation matrix based on the model. In some embodiments, the RTTs are scaled by a factor given by $$F = \frac{\sqrt{R_n^2 - Alt_n^2}}{R_n};$$

where $Alt_n$ is an altitude of the airborne station and $R_n$ is the range in the same units as the altitude. In some embodiments, the residuals are minimized based at least in part on minimizing a sum of squared residuals. In some embodiments, the airborne station is further configured to scale the longitude $X_{n-q}$ by COS $(Y_{n-q})$. In some embodiments, a measure of a final value of an RTT is based at least in part on an average of a number predetermined RTTs. In some embodiments, Rn is determined based at least in part on a delay that is determined when the WD is stationary. In some embodiments, the residuals are based at least in part on a horizontal distance between the WD and the airborne station.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

This Application incorporates U.S. Patent Application Publication Nos. 2020/0158852 A1 and 2020/0166630 A1 by reference in their entirety.

Although this disclosure uses Wi-Fi as an example for the measurement of the round trip time (RTT), it should be clear to someone skilled in the art that the RTT measurement processes described herein can be measured for other wireless technologies and is thus not limited solely to Wi-Fi. Reference to a wireless device (WD) herein may therefore refer to a wireless local area network (WLAN) device, although embodiments are not limited to WLAN devices.

In one embodiment of the present disclosure, a single airborne measuring station is used. A method and devices are disclosed that locate a target station moving at a constant velocity. A method and devices are disclosed for producing an RTT vector that is based upon the changes in position of the airborne measuring station position and the relative change in position of the target station. In one embodiment, the target station is an access point or station conforming to the IEEE 802.11 Standard and the airborne measuring station may also be a device that conforms to the IEEE 802.11 Standard.

Figure 3:
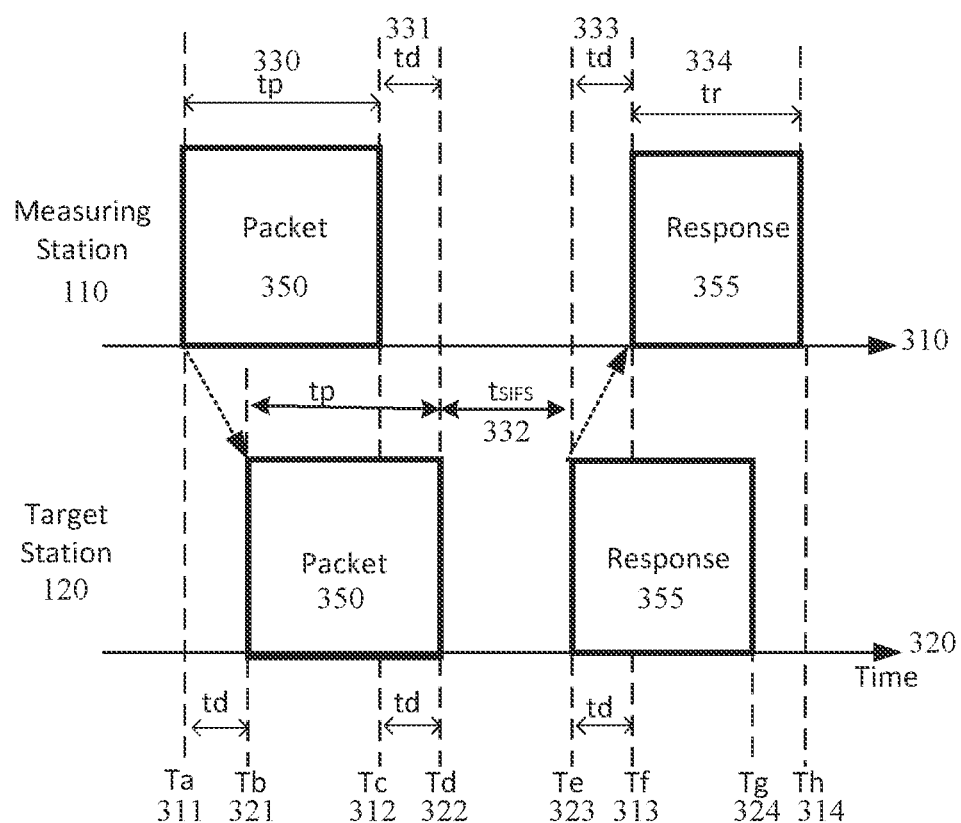
FIG. 3 is a timing diagram that describes a ranging transmission method for the measurement of RTTs from an airborne measuring station to a target station.

Returning to the drawing figures in which like reference numerals refer to like elements, there is shown in FIG. 3 a timing diagram that describes ranging a transmission method for the measurement of RTTs from an airborne measuring station 110 to a target station 120. Time axis 310 is the time axis for the airborne measuring station 110 and time axis 320 is the time axis for the target station 120. At time Ta 311, the airborne measuring station 110 starts the transmission of request packet 350 which is addressed to the target station 120. Packet 350 may, for example, be a data null or an RTS packet. After a time delay of td, at time Tb 321, the target station 120 starts to receive packet 350. At time Tc 312, the airborne measuring station 110 completes the transmission of packet 350 and at time Td 422, target station 120 completes the reception of packet 350. The time difference between Tc 412 and Td 422 is td 331, the propagation time for the packet to travel from the airborne measuring station 110 to the target station 120. Note that the time differences (Tc–Ta) and (Td–Tb) are both the duration tp 330 of the transmitted packet 350.

The target station 120 transmits the response packet 355 at time Te 323. The response packet 355 may be an ACK or an RTS packet in reply to the received request packet 350, time Te 323 ideally will be at a time $t_{SIFS}$ 332 after time Td 322, where $t_{SIFS}$ 332 is the SIFS time as defined in the IEEE 802.11 Standard. In the general sense, individual stations may exhibit a variation, or delay, in the value of $t_{SIFS}$ 332. At time Tf 313, the airborne measuring station 110 starts to receive the response packet 355. The time difference between Te 323 and Tf 313 is td 333. At time Tg 324, the target station 120 completes the transmission of the response packet 355 and at time Th 314, the airborne measuring station 110 completes receiving the response packet 355. Note that the time differences (Tb–Ta), (Td–Tc), (Tf–Te) and (Th–Tg) are all equal and have the value td which is the propagation time for the request packet and response packet to travel between the two stations.

At the airborne measuring station 110, the time recorded for a packet may be taken at the end point of a frame where the frame check sum FCS frame has completed. Hence, the recorded time for the transmission of request packet 350 is time Tc 312, and the time that is recorded for the reception of the response packet 355 is time Th 314. In order to calculate the value of RTT, it is necessary to know the duration tr 334 of the response packet 355. Calculating the duration tr 334 is straightforward as the airborne measuring station 110 can monitor details of the response packet such as data rate and length. In practice therefore, the airborne measuring station 110 can calculate the value of TOF from expression (1):

$$RTT = (Th - Tc - tr - t_{SIFS}) \quad (1)$$

and hence, the corresponding distance, $R = RTT \times C/2$ (2)

As mentioned previously, the packet exchange may be any pair of packets where an automatic response packet is sent. Commonly used Wi-Fi packets include an RTS/CTS exchange and a Data (null)/ACK exchange.

Figure 4:
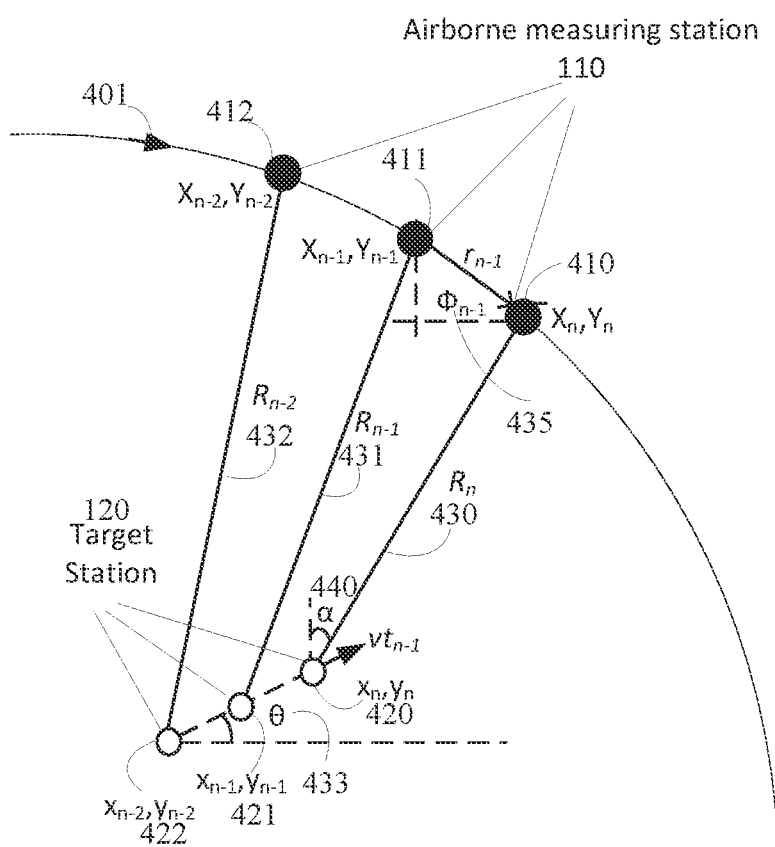
FIG. 4 is a diagram of an example of an airborne measuring station depicted moving in a clockwise direction on a path, and a target station moving at a constant velocity v at an angle θ relative to the easterly direction.

FIG. 4 is a diagram of an example of an airborne measuring station 110 depicted moving in a clockwise direction on a path 401, and a target station 120 moving at a constant velocity v at an angle θ 433 relative to the easterly direction. At specific times, T, the target station 120 may transmit a response packet 355. At time $T_n$, the airborne measuring station 110 is at position $(X_n, Y_n)$ 410, and the target station 120 is at location $(x_n, y_n)$ 420. At time $T_{n-1}$, the airborne measuring station 110 was at position $(X_{n-1}, Y_{n-1})$ 411, and the target station 120 was at location $(x_{n-1}, y_{n-1})$ 421. At time $T_{n-2}$, the airborne measuring station 110 was at position $(X_{n-2}, Y_{n-2})$ 412, and the target station 120 was at location $(x_{n-2}, y_{n-2})$ 422. Note that, in this example, the airborne measuring station 110 is moving from position $(X_{n-2}, Y_{n-2})$ 412, to position $(X_{n-1}, Y_{n-1})$ 411 to position $(X_n, Y_n)$ 410. Hence, position $(X_n, Y_n)$ 410 represents the latest position, and $T_{n-2}$ is earlier than $T_{n-1}$, and $T_{n-1}$ is earlier than $T_n$. At time $T_{n-2}$, the target station 120 was at location $(x_{n-2}, y_{n-2})$ 422, and at time $T_{n-1}$, the target station 120 was at location $(x_{n-1}, y_{n-1})$ 421. The target station 120 is moving in a straight line at a constant velocity v, angle θ 430. Therefore the distance between location $(x_{n-2}, y_{n-2})$ 422 and $(x_{n-1}, y_{n-1})$ 421 is $vt_{n-1}$, where $t_{n-1}=T_{n-2}-T_{n-1}$. Similarly, the distance between position $(x_{n-1}, y_{n-1})$ 421 and $(x_n, y_n)$ 420 is $vt_n$, where $t_n=T_{n-1}-T_n$.

At time $T_n$, when the airborne measuring station 110 is at position $(X_n, Y_n)$ 410, the distance to the target station 120 is $R_n$ 430 and $R_n$ 430 is at an angle α 440 where:

$$\cos \alpha = (Y_n - y_n)/R_n \text{ and } \sin \alpha = (X_n - x_n)/R_n$$

At time $T_{n-1}$, when the airborne measuring station 110 is at position $(X_{n-1}, Y_{n-1})$ 411, the distance to the target station 120 is $R_{n-1}$ 431, and at time $T_{n-2}$, when the airborne measuring station 110 is at position $(X_{n-2}, Y_{n-2})$ 412, the distance to the target station 120 is $R_{n-2}$ 432.

For q=1 to q, the distance $r_{n-q}$ between positions $(X_{n-q}, Y_{n-q})$ and $(X_n, Y_n)$, is:

$$r_{n-q} = \sqrt{(X_n - X_{n-q})^2 + (Y_n - Y_{n-q})^2} \tag{3}$$

The distance $r_{n-2}$ between positions $(X_{n-2}, Y_{n-2})$ 411 and $(X_n, Y_n)$ 410, is:

$$r_{n-2} = \sqrt{(X_n - X_{n-2})^2 + (Y_n - Y_{n-2})^2}$$

where $r_{n-1}$ is at an angle $\emptyset_{n-1}$ 435, and where $$\cos \emptyset_{n-1} = (X_n - X_{n-1})/r_{n-1} \text{ and } \sin \emptyset_{n-1} = (Y_{n-1} - Y_n)/r_{n-1}$$

Hence, $$\emptyset_{n-q} = A\text{COS}\left(\frac{(X_n - X_{n-q})}{r_{n-q}}\right) \tag{4}$$

And $r_{n-q}(t)\text{COS } \emptyset_{n-q} = (X_n - X_{n-q}) = \Delta X_{n-q}$ (5)

$r_{n-q}(t)\text{SIN } \emptyset_{n-q} = -(Y_n - Y_{n-q}) = -\Delta Y_{n-q}$ (6)

The target station 120 is moving at angle θ 433 at a velocity of v. Hence, the distance travelled is vt, where t is time between readings:

$vt_{n-q} \text{ COS } \theta = x_n - x_{n-q} = \Delta x_{n-q}$ (7)

$vt_{n-q} \text{ SIN } \theta = y_n - y_{n-q} = \Delta y_{n-q}$ (8)

Figure 5:
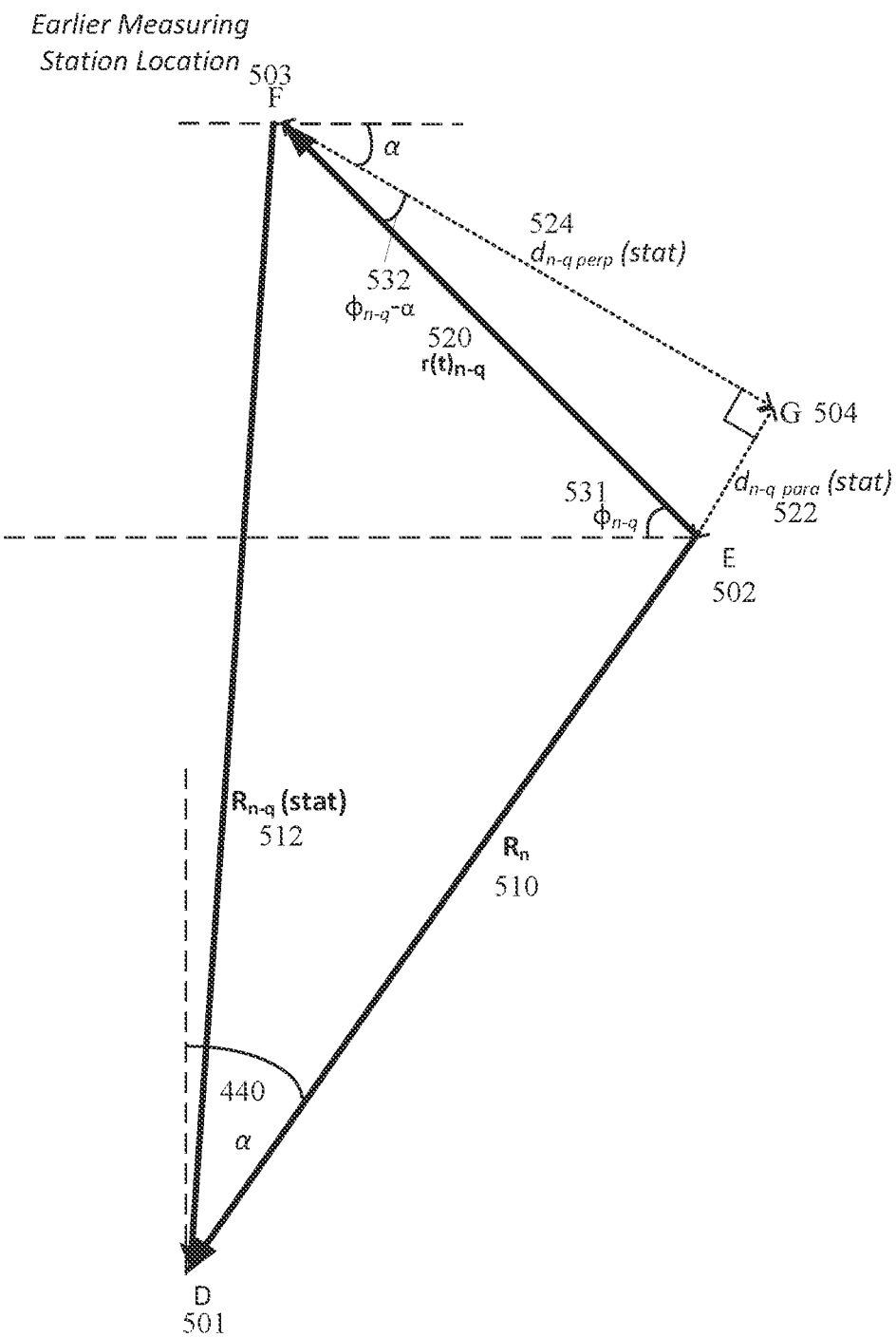
FIG. 5 is a vector diagram corresponding to FIG. 4 where v=0, i.e., the target station is stationary.

FIG. 5 is a vector diagram corresponding to FIG. 4 where v=0, i.e., the target station 120 is stationary. Rn 510 extends between points D 501 and E 502 and makes an angle α 440 with respect to a reference axis. Vector $r(t)_{n-q}$ 520, the change of position of the airborne measuring station 110, is between points E 502 and F 503. Vector $R_{n-q}$ (stat) 512 is the sum of vectors $R_n$ 510 and $-r(t)_{n-q}$ 520, and is between points D 501 and F 503:

$$R_{n-q}(\text{stat}) = R_n + r(t)_{n-q} \tag{9}$$

Vector $r(t)_{n-q}$ 520 is at an angle $\emptyset_{n-q}$ 531 as discussed above with reference to equations (4), (5) and (6).

Define $d_{n-q}(\text{stat}) = r(t)_{n-q}$ and define unit vector $u: u = R_n/R_n$ Then: $d_{n-q\,para}(\text{stat}) = d_{n-q}(\text{stat}) \cdot u$ And: $d_{n-q\,perp}(\text{stat}) = |d_{n-q}(\text{stat}) \times u|$ With reference to FIG. 5, $d_{n-q\,para}$ (stat) 522 is between points E 502 and G 504, and $d_{n-q\,perp}$ (stat) 524 is between points G 504 and F 503. In triangle EFG, angle ∠EFG 532 is $(\emptyset_{n-q} - \alpha)$, hence:

$$d_{n-q\,para}(\text{stat}) = r_{n-q}(t)\text{SIN}(\emptyset_{n-q} - \alpha) \tag{10}$$

and: $d_{n-q\,perp}(\text{stat}) = r_{n-q}(t) \text{ COS } (\emptyset_{n-q} - \alpha)$ (11)

Hence, $R_{n-q}$ (stat) 512 is:

$$R^2_{n-q}(\text{stat}) = [Rn + d_{n-q\,para}(\text{stat})]^2 + d^2_{n-q\,perp}(\text{stat})$$

And: $\Delta R_{n-q}(\text{stat}) = R_{n-q}(\text{stat}) - R_n$ $$\Delta R_{n-q}(\text{stat}) = \sqrt{R_n + d_{n-q}(\text{stat})^2 + d_{n-q}^2(\text{stat})} - R_n \tag{12}$$

Figure 6:
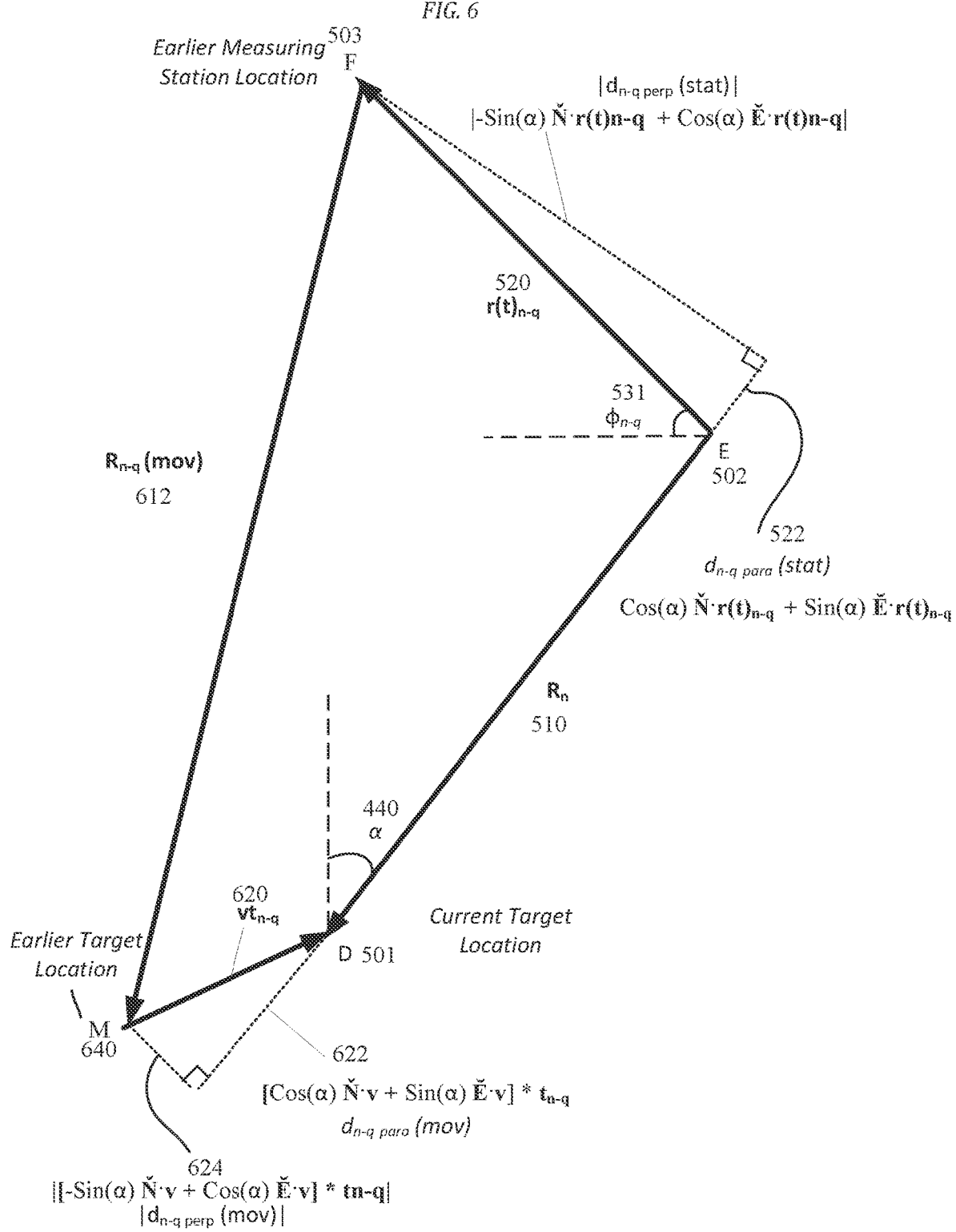
FIG. 6 is a vector diagram corresponding to FIG. 4 where the target station is moving at velocity v.

FIG. 6 is a vector diagram corresponding to FIG. 4 where the target station 120 is moving at velocity v from location M 640 to location D 501. Vector $r(t)_{n-q}$ 520, the change of position of the airborne measuring station 110 is between points E 502 and F 503. Vector $R_n$ 510 is the vector from the airborne measuring station 110 at location E 502, the current location of the airborne measuring station 110, to the target station 120 at location D 501, the current location of the target station 120. Vector $r(t)_{n-q}$ 520 is the change of position of the airborne measuring station 110, which moves from location F 503, a previous location, to location E 502. Vector $vt_{n-q}$ 620 represents the displacement of the target station 120 from location M 640, at a time corresponding to when the airborne measuring station was at location F 503, to location D 501, at a time corresponding to when the airborne measuring station 110 is at location E 502. Rn–q 612 is a vector from the airborne measuring station 110 when at location F 503 to the target station 120 at location M 640.

A more complete understanding of the present disclosure, and the attendant advantages and features thereof, will be more readily understood by reference first to a vector analysis of the relationship of various vectors and components, followed by a detailed trigonometric analysis.

Each time, $T_n$-q, that the target station 120 sends a response packet 355 after having received a request packet 350 from the airborne measuring station 110, there is an opportunity to determine absolute distances. more importantly, the changes in RTT, $\Delta$RTT, may be used to determine directions and velocities without need of knowing the value of the SIFS time tsifs 332. Hence, $\Delta$RTTq can be associated with a change in distance where:

$$\text{change-in-distance} = c * \Delta RTTq/2 = Rn\text{-}q\text{-}Rn$$

With reference to FIG. 6, distances Rn-q and Rn are related to the magnitudes of the corresponding vectors $R_{n-q}$ 612 and $R_n$ 510:

$$Rn\text{-}q\text{-}Rn = |Rn\text{-}q| - |Rn|$$

With reference again to FIG. 6: $Rn\text{-}q = -r(t)_{n-q} + Rn - v(t_n - t_{n-q})$.

Define: $d_{n-q} = -r(t)_{n-q} - v(t_n - t_{n-q})$.

then: $d_{n-q\,para} = d_{n-q} \cdot u$ and: $d_{n-q\,perp} = |d_{n-q} \times u|$ Then the differences in RTT measurements, $\Delta$RTT, between an earlier time, $t_{n-q}$, and the current time, $t_n$, is:

$$(c/2) * \Delta RTT = Rn - q - Rn = \left|-r(t)_{n-q} + Rn - vt_{n-q}\right| - |Rn|$$

$$= |Rn + d_{n-q}| - |Rn|$$

$$= \sqrt{(Rn + d_{n-q}) \cdot (Rn + d_{n-q})} - Rn$$

$$= \sqrt{(Rn^2 + d_{n-q}^2 + 2Rn \cdot d_{n-q})} - Rn$$

$$= \sqrt{Rn^2 + d_{n\text{-}qpara}^2 + d_{n\text{-}qperp}^2 + 2Rn * d_{n\text{-}qpara}} - Rn$$

$$= \sqrt{(Rn + d_{n\text{-}qpara})^2 + d_{n\text{-}q\,perp}^2} - Rn$$

Then:

$$\Delta RTT = (2/c) * (Rn - q - Rn) \tag{13}$$

$$= (2/c) * Rn * \left\{\sqrt{\left(1 + \frac{d_{n-q\,para}}{Rn}\right)^2 + \left(\frac{d_{n-q\,perp}}{Rn}\right)^2} - 1\right\}$$

Equation (13) has two unknowns, $d_{n-q\,para}$ and $d_{n-q}$ perp. Rn may be calculated from the final RTT measurement at time Tn. The parameters of interest are the angle $\alpha$ 440 of Rn 510 relative to north (azimuth to target) and the components of the velocity v of the target station 120 relative to the geographic coordinate system, $v_N$ and $v_E$. The unknowns $d_{n-q\,para}$ and $d_{n-q\,perp}$ may be written in known terms $\Delta r_N$ and $\Delta r_E$ and unknown variables $v_N$ and $v_E$ using the unit vector u=Rn/Rn:

$$u = Rn/Rn = \cos(\alpha)\check{N} + \sin(\alpha)\check{E}$$

$$\Delta r_N = \check{N} \cdot r(t)_{n-q}, \Delta r_E = \check{E} \cdot r(t)_{n-q}$$

$$v_N = \check{N} \cdot v, \quad v_E = \check{E} \cdot v$$

where $\check{N}$ is the unit vector in the north direction and $\check{E}$ is the unit vector in the east direction. Hence $$-d_{n\text{-}q\,para} = -u \cdot d_{n\text{-}q} \tag{14}$$

$$= \cos(\alpha)\check{N} \cdot r(t)_{n\text{-}q} + \sin(\alpha)\check{E} \cdot r(t)_{n\text{-}q} + [\cos(\alpha)\check{N} \cdot v + \sin(\alpha)\check{E} \cdot v] * (t_n - t_{n\text{-}q})$$

$$= \cos(\alpha)\Delta r_N + \sin(\alpha)\Delta r_E + [\cos(\alpha)v_N + \sin(\alpha)v_E] * (t_n - t_{n\text{-}q})$$

And:

$$-d_{n\text{-}q\,perp} = -|u \times d_{n\text{-}q}| \tag{15}$$

$$= \left|-\sin(\alpha)\check{N} \cdot r(t)_{n\text{-}q} + \cos(\alpha)\check{E} \cdot r(t)_{n\text{-}q} + [-\sin(\alpha)\check{N} \cdot v + \cos(\alpha)\check{E} \cdot v] * (t_n - t_{n\text{-}q})\right|$$

$$= |-\sin(\alpha)\Delta r_N + \cos(\alpha)\Delta r_E + [-\sin(\alpha)v_N + \cos(\alpha)v_E] * (t_n - t_{n\text{-}q})|$$

Where the 2D relation $|A \times B| = |-A_y B_x + A_x B_y|$ has been used. Referring again to FIG. 5, the term $[\cos(\alpha) \Delta r_N + \sin(\alpha) \Delta r_E]$ in equation (14) is $d_{n-q\,para}$ (stat)522 and the term $[-\sin(\alpha) \Delta r_N + \cos(\alpha) \Delta r_E]$ is $d_{n-q}$ perp (stat) 524. The remaining terms in equations (14) and (15) refer to the movement of the target station 120 and hence, referring again to FIG. 6, the term $[\cos(\alpha) v_N + \sin(\alpha) v_E] * (t_n - t_{n-q})$ in equation (14) is $d_{n-q\,para}$ (mov) 622 and the term $[-\sin(\alpha) v_N + \cos(\alpha) v_E] * (t_n - t_{n-q})$ in equation (15) is $d_{n-q\,perp}$ (mov) 624.

In equations (14) and (15), the only unknown quantities are $\alpha$ 440 and v (or equivalently the north component $v_N$ and the east component $v_E$). The quantity $r(t)_{n-q}$ ($\Delta r_N$, $\Delta r_E$) is the known difference in the airborne measuring station 110 locations, F 503 and E 502 which may be determined, for example, from a GPS module 860 on the airborne measuring station 110 as discussed below with reference to FIG. 8.

In one embodiment of this disclosure, the method for determining the angle of arrival $\alpha$ 440, and the components of target velocity $v_N$ and $v_E$ is to measure the $\Delta$RTT for 30 to 90 seconds (as required to generate statistics) and vary the parameters $\alpha$, $v_N$, and $v_E$ in equations (14) and (15) substituted into equation (13) until a best fit to the data is obtained as discussed below with reference to step 911 in FIG. 9. If the airborne measuring station 110 is at a different altitude compared to the target station 120 at ground level, then all distances obtained from RTTs may be projected to the ground level by factor F which may be accomplished by taking the square root of the sum of the distance squared minus the altitude squared, in the same units, i.e., $$F = \frac{\sqrt{R_n^2 - Alt_n^2}}{R_n}.$$

Figure 7:
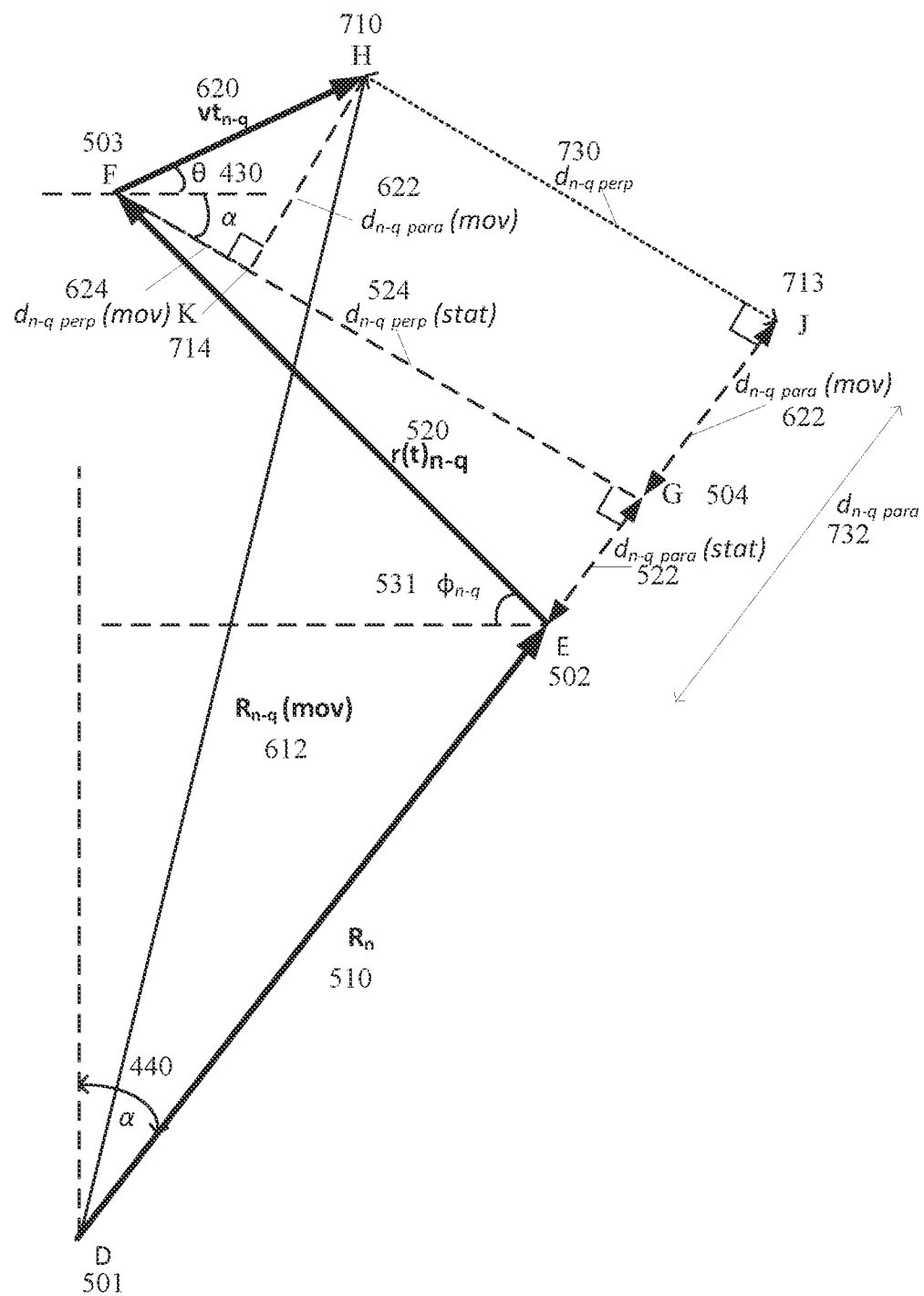
FIG. 7 is a vector diagram corresponding to FIG. 4 where the target station is moving at velocity v in direction θ.

FIG. 7 is a vector diagram corresponding to FIG. 4 where the target station 120 is moving at velocity v in direction θ 430. $R_n$ 510 is at an angle of α 440 between points D 501 and E 502. Vector $r(t)_{n-q}$ 520, the change of position of the airborne measuring station 110, is between points E 502 and F 503. Note that vector $vt_{n-q}$ 620 is between points F 503 and H 710. It should be noted that the vector $vt_{n-q}$ is the same vector as $vt_{n-q}$ 620 in FIG. 6, but is drawn from point F 503, which is in accordance with the cumulative law for addition of vectors. Vector $R_{n-q}$ (mov) 612 is the sum of vectors $R_n$, $r(t)_{n-q}$, and $vt_{n-q}$, and is between points D 501 and H 610:

$$R_{n-q}(mov) = R_n + r(t)_{n-q} + vt_{n-q} \quad (16)$$

Vector $vt_{n-q}$ 620 is at an angle θ 430 as discussed above with reference to equations (7) and (8).

Define $d_{n-q}$ (mov) = $vt_{n-q}$ then $d_{n-q\,para}(mov) = d_{n-q}(mov) \cdot u$ and $d_{n-q}$ perp(mov) = $|d_{n-q}(mov) \times u|$ With reference to FIG. 7, $d_{n-q\,para}$ (mov) 622 is between points H 710 and K 714, and also between points J 713 and G 504. Also with reference to FIG. 7, $d_{n-q\,perp}$ (mov) 624 is between points F 503 and K714.

In triangle HFK, angle ∠HFK is (θ+α), hence, $$d_{n-q\,para}(mov) = vt\,SIN(\theta+\alpha) \quad (17)$$

and: $d_{n-q}$ perp(mov) = $vt\,COS(\theta+\alpha)$ $\quad (18)$

From FIG. 7 triangle DHJ, and equation (16), $d_{n-q\,para}$ 732 and $d_{n-q\,perp}$, 730, are:

$$d_{n-q\,para} = d_{n-q\,para}(stat) + d_{n-q\,para}(mov) \quad (19)$$

$$d_{n-q\,perp} = d_{n-q}\,perp(stat) - d_{n-q\,perp}(mov) \quad (20)$$

And $R^2_{n-q}(mov) = [Rn + d_{n-q\,para}]^2 + d_{n-q\,perp}$

Hence, $\Delta R_{n-q}$ (mov) = $(R_n + d_{n-q\,para})^2\,d_{n-q\,perp}{}^2 - R_n \quad (21)$ Substituting equations (10) and (16), into equation (19):

$$d_{n-q\,para} = r_{n-q}(t)SIN(\phi_{n-q} - \alpha) + vt\,SIN(\theta+\alpha)$$

Expanding the SIN terms:

$$d_{n-q\,para} = r_{n-q}(t)\,(SIN\,\phi_{n-q}\,COS\,\alpha - COS\,\phi_{n-q}\,SIN\,\alpha) + vt\,(SIN\,\theta COS\,\alpha + COS\,\theta\,SIN\,\alpha)$$

Substituting equations (5), (6), (7) and (8):

$$d_{n-q\,para} = -\Delta Y_{n-q}\,COS\,\alpha - \Delta X_{n-q}\,SIN\,\alpha + \Delta y_{n-q}\,COS\,\alpha + \Delta x_{n-q}\,SIN\,\alpha \quad (22)$$

Substituting equations (11) and (17), into equation (20):

$$d_{n-q\,perp} = r_{n-q}(t)\,COS\,(\phi_{n-q} - \alpha) - vt\,COS\,(\theta+\alpha)$$

Expanding the COS terms:

$$d_{n-q\,perp} = r_{n-q}(t)\,(COS\,\phi_{n-q}\,COS\,\alpha - SIN\,\phi_{n-q}\,SIN\,\alpha) - vt\,(COS\,\theta COS\,\alpha - SIN\,\theta\,SIN\,\alpha)$$

Substituting equations (5), (6), (7) and (8):

$$d_{n-q\,perp} = \Delta Y_{n-q}\,SIN\,\alpha - \Delta X_{n-q}\,COS\,\alpha + \Delta y_{n-q}\,SIN\,\alpha - \Delta x_{n-q}\,COS\,\alpha \quad (23)$$

From equation (21), dividing and multiplying by $R_n$ shows the change in RTT, ΔRTT:

$$\Delta RTT = \left(\frac{2R_n}{C}\right)\left\{\sqrt{\left(1+\frac{d_{n-q\,para}}{Rn}\right)^2 + \left(\frac{d_{n-q\,perp}}{Rn}\right)^2} - 1\right\}$$

(24)

It may be noted that equation (24) is the same as equation (13).

In equations (22) and (23), $\Delta Y_{n-q}$, and $\Delta X_{n-q}$ are the differences in longitude and latitude, respectively, of the airborne measuring station 110 between the time $t_n$ of the last measurement of $R_n$ and the time $t_{n-q}$ when $R_{n-q}$ was measured. Note that $\Delta Y_{n-q}$ may be corrected for higher latitudes.

In equations (22) and (23):

$$\Delta y_{n-q} = v_N(t_n - t_{n-q}), \quad (25)$$

where $v_N$ is the velocity of the target station 120 in the northerly direction.

And: $\Delta x_{n-q} = v_E(t_n - t_{n-q}), \quad (26)$ where $v_E$ is the velocity of the target station 120 in the easterly direction.

Hence, the equation (24) with substitutions for $d_{n-q\,para}$ and $d_{n-q\,perp}$ from equations (22) and (23), and then $v_N$ and $v_E$ from equations (25) and (26) describe the measurement ΔRTT in terms of three parameters, α, $v_N$, and $v_E$ and two variables, $\Delta Y_{n-q}$ and $LX_{n-q}$.

Hence, in summary:

$$\Delta RTT = \left(\frac{2R_n}{C}\right)\sqrt{\left(1+\frac{d_{n-q\,para}}{R_n}\right)^2 + \frac{d^2_{n-q\,perp}}{R_n}} - 1 \quad (24)$$

where $$d_{n-q\,para} = -\Delta Y_{n-q}\,COS\,\alpha - \Delta X_{n-q}\,SIN\,\alpha + v_N(t_n - t_{n-q})\,COS\,\alpha + v_E(t_n - t_{n-q})SIN\,\alpha \quad (27)$$

And $$d_{n-q\,perp} = \Delta Y_{n-q}\,SIN\,\alpha - \Delta X_{n-q}\,COS\,\alpha + v_N(t_n - t_{n-q})\,SIN\,\alpha - v_E(t_n - t_{n-q})COS\,\alpha \quad (28)$$

There is a third variable, the altitude of the airborne measuring station 110, but this may be used to scale the ΔRTT to a horizontal component. The RTT measurements may be multiplied by a factor F to account for the ratio of the horizontal distance RH from the airborne measuring station 110 and the target station 120. Hence, $R_{Hq}$=RTT·F, where $$F = \frac{\sqrt{R_n^2 - Alt_n^2}}{R_n}.$$

It may be assumed that the altitude does not change significantly over the time of the measurements, and hence, to simplify the procedure, only the final RTT may be used for the correction. Alternatively, each RTT measurement could be factored. Also the longitude measurement X" may be scaled by a factor to account for reduced distance per degree when not at the equator.

Hence, $X'n-q = X_{n-q} \cdot COS\,(Xe)$.

Figure 1:
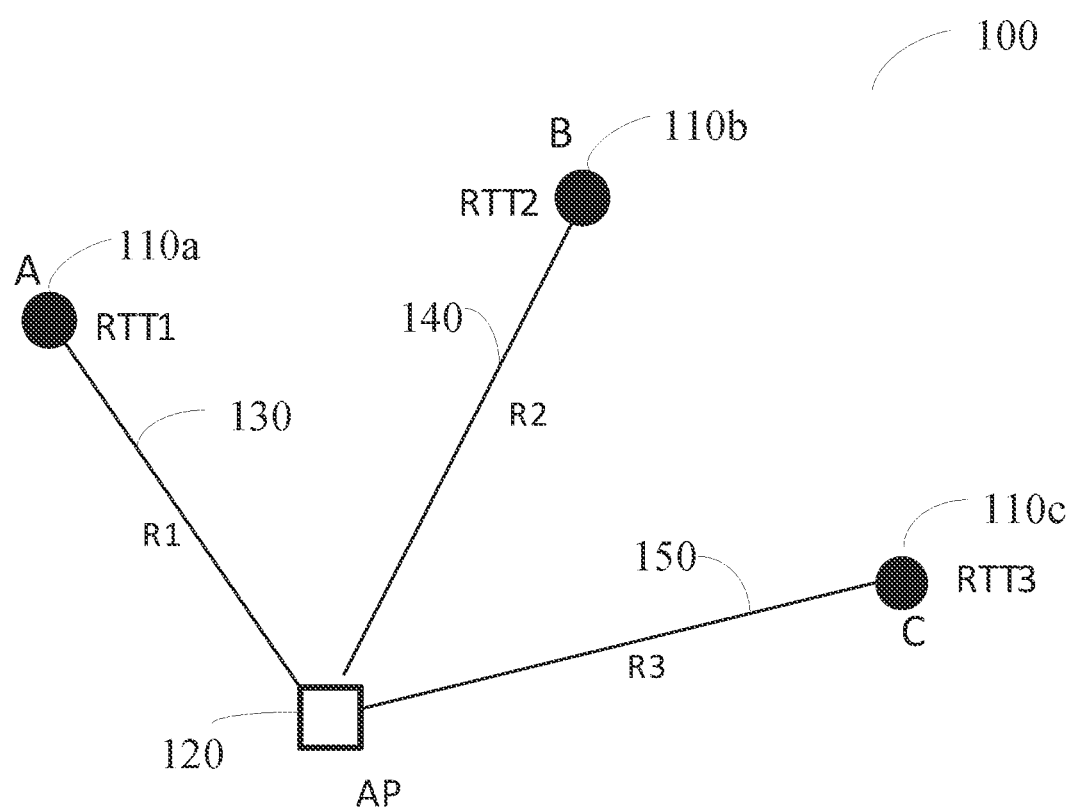
FIG. 1 is a diagram of a typical location system which includes three airborne measuring stations.
Figure 2:
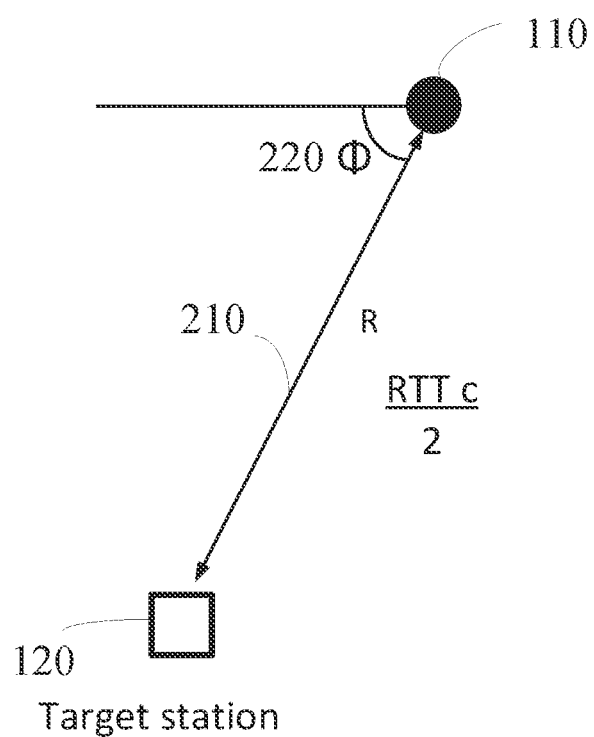
FIG. 2 is a diagram of an airborne measuring station that is transmitting a ranging signal to a target station.

The fitting parameters α, $v_N$, and $v_E$ as defined in equations (24), (27) and (28) may be varied to minimize the sum of the least square differences for the measured ΔRTT with time, resulting from the RTT measurements as described above with reference to FIGS. 1, 2 and 3, and the calculated $\Delta R_{n-q}$ (mov) as per equation (18) for q=1 to q.

Figure 8:
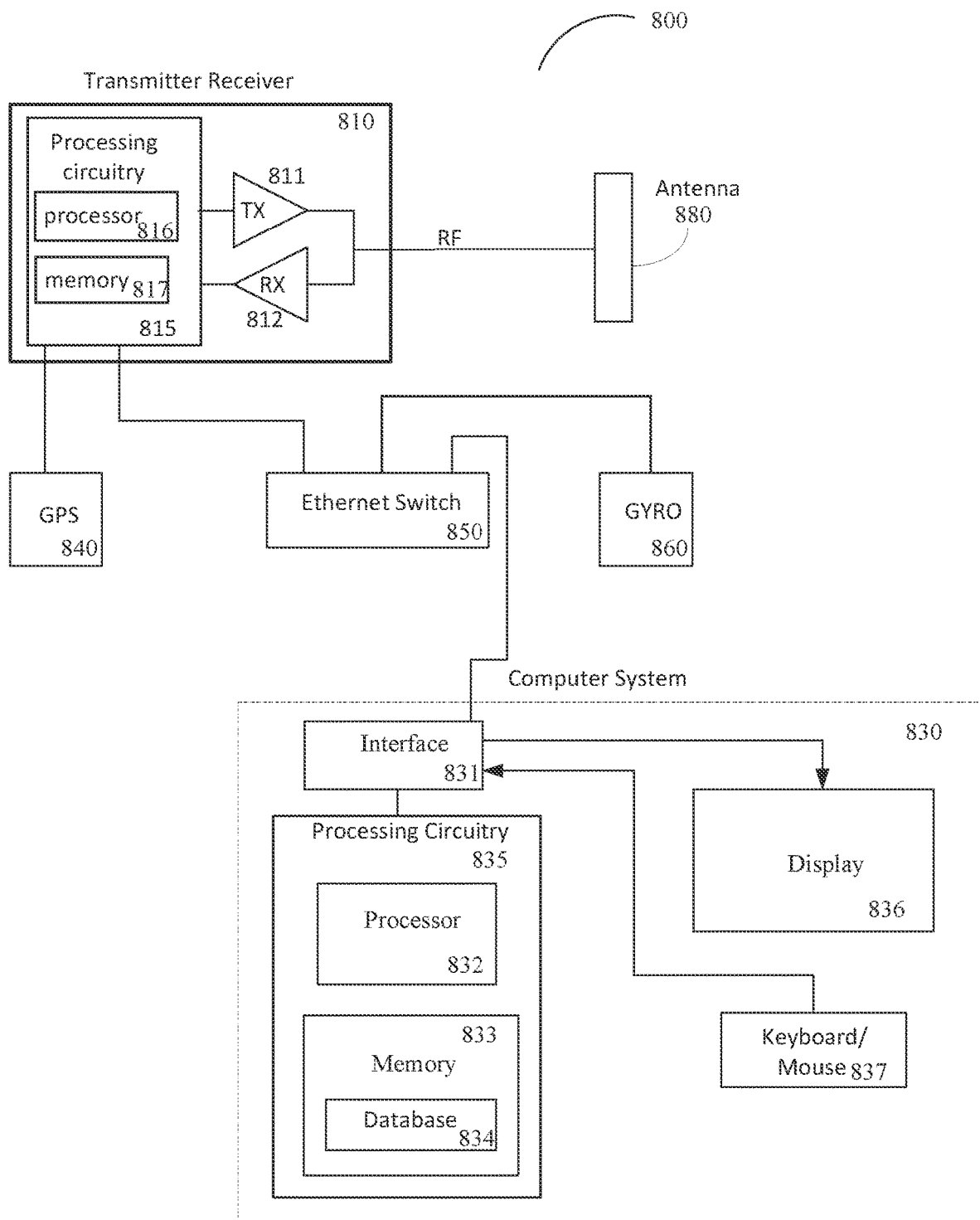
FIG. 8 is a block diagram of an example measuring system that may be used in accordance with the principles described herein.

FIG. 8 is a block diagram of an example measuring system 800 that may be used in accordance with the principles described herein. In one embodiment, measuring system 800 may be the airborne measuring station 110. In one embodiment, measuring system 800 may include an antenna assembly 880, a transmitter receiver 810, a computer system 830, a global positioning system (GPS) module 840, a gyro module 860 and a network switch 850 such as an Ethernet switch.

The transmitter receiver 810 may transmit or receive radio frequency (RF) signals to and from the antenna assembly 880. The GPS module 840 output may be connected to the transmitter receiver 810. The GPS module 840 may provide the latitude, longitude and altitude of the airborne platform of the measuring system 800. The transmitter receiver 810 may append GPS information to any RF transmission and/or reception. The network switch 850 may be connected to the Transmitter Receiver 810 and the computer system 830. The transmitter receiver 810 may include an RF transmitter 811, an RF receiver 812 and processing circuitry 815. The RF receiver 812 may receive RF signals from the antenna assembly 880. The RF receiver 812 may comprise one or more receiver paths. The RF receiver 812 may perform the usual functions of an RF receiver such as low noise amplification, filtering, and frequency down conversion so as to condition the received signal suitable for inputting to the processing circuitry 815. The processing circuitry 815 may perform the usual baseband functions such as demodulation, descrambling, and error correction of received packets as described in the I.E.E.E. 802.11 Standard. The RF transmitter 811 may comprise one or more transmitter paths. The RF transmitter 811 may perform the usual function of an RF transmitter such as up conversion, filtering and power amplification of the baseband signal received from the processing circuitry 815 for transmission via the antenna assembly 880. The processing circuitry 815 may perform the usual baseband functions such as coding, scrambling and modulation of packets to be transmitted as described in the above-referenced I.E.E.E. 802.11 Standard. The processing circuitry 815 may comprise a processor 816 and a memory 817. The processing circuitry 815 may be configured to control any of the methods and/or processes described herein and/or to cause such methods, and/or processes to be performed, e.g., by the transmitter receiver 810. The memory module 817 is configured to store data, programmatic software code and/or other information described herein. In some embodiments, the software may include instructions that, when executed by the processing circuitry 815, causes the processing circuitry 815 to perform the processes described herein with respect to the transmitter receiver 810.

According to this embodiment of the disclosure, the transmitter receiver 810 may be configured to measure and monitor an input signal's attribute, such as may include one or more of a ranging signal transmitted by RF transmitter 811, data and control packets, and the response signal, including control packets, transmitted by an access point or station that may be based upon the I.E.E.E. 802.11 Standard, as discussed above with reference to FIG. 3. Such packets may include data null, ACK, RTS and CTS packets. The memory 817 may store instructions for executing any method mentioned in the I.E.E.E. 802.11 Standard, input signals, and results of processing of the processor 816, signals to be outputted and the like.

According to an embodiment of the disclosure, the RF transmitter 811 may be configured to transmit signals and the processing circuitry 815 may be configured to prepare the transmitted signal attributes based upon the I.E.E.E. 802.11 Standard. Such transmitted packets may include data packets, control packets and management packets that are to be transmitted by a wireless station that is based upon the I.E.E.E. 802.11 Standard. Such data packets may include data null packets. Such control packets may include RTS packets. The memory 817 may store instructions for executing any method mentioned in the specification, input signals, and results of processing of the processor 816, signals to be outputted and the like.

According to another embodiment of the disclosure, the transmitter receiver 810 may be configured to receive the transmissions of another target station 120 and the processing circuitry 815 may be configured to monitor an attribute of the transmissions of the other target station 120, and determine the value of the time of arrival of packets from the other target station 120, as discussed above with reference to FIG. 3. In addition, according to an embodiment of the disclosure, the transmitter receiver 810 may be configured to measure the times of departure of the transmissions from the RF transmitter 811.

The GPS information may be provided to the processing circuitry 815 by the GPS module 840. RF receptions may have the GPS information added such that the position of the airborne platform 110 is known for each received signal. The transmitter receiver 810 may include more than one radio and therefore any transmission may be automatically received by another radio within the transmitter receiver and by this means, the airborne platform position 110 is also known for each transmission. The GPS information may be sent to the network switch 850 and therefore made available to the computer system 830.

The computer system 830 may include an interface 831. Interface 831 may contain an Ethernet connection to the network switch 850, the connection to a display 836, a connection to a keyboard and mouse 837 as well as interfacing to the processing circuitry 835. In some embodiments, the processing circuitry 835 may include a processor 832, a memory 833 and a database 834. The database 834 may contain the ground mapping information of the area of interest and the processor 832 and memory 833 may be used to carry out the example processes described below with reference to FIG. 9, using information on the position of the airborne platform derived from the GPS module 840, the gyro module 860, and information on the target station 120 which may be inputted using the keyboard and mouse 837. The display 836 may be used to show the ground map together with the estimated location(s) of the target station 120. Note that the modules discussed herein may be implemented in hardware or a combination of hardware and software. For example, the modules may be implemented by a processor executing software instructions or by application specific integrated circuitry configured to implement the functions attributable to the modules. Also note that the term "connected to" as used herein refers to "being in communication with" and is not intended to mean a physical connection nor a direct connection. It is contemplated that the signal path between one element and another may traverse multiple physical devices.

Thus, in some embodiments, the processing circuitry 835 may include the memory 833 and a processor 832, the memory 833 containing instructions which, when executed by the processor 832, configure the processor 832 to perform the one or more functions described herein. In addition to a traditional processor and memory, the processing circuitry 835 may comprise integrated circuitry for processing and/or control, e.g., one or more processors and/or processor cores and/or FPGAs (Field Programmable Gate Array) and/or ASICs (Application Specific Integrated Circuitry).

The processing circuitry 835 may include and/or be connected to and/or be configured for accessing (e.g., writing to and/or reading from) the memory 833, which may include any kind of volatile and/or non–volatile memory, e.g., cache and/or buffer memory and/or RAM (Random Access Memory) and/or ROM (Read-Only Memory) and/or optical memory and/or EPROM (Erasable Programmable Read-Only Memory). Such memory 833 may be configured to store code executable by control circuitry and/or other data, e.g., data pertaining to communication, e.g., configuration and/or address data of nodes, etc. The processing circuitry 835 may be configured to control any of the methods described herein and/or to cause such methods to be performed, e.g., by the processor 832. Corresponding instructions may be stored in the memory 833, which may be readable and/or readably connected to the processing circuitry 835. In other words, the processing circuitry 835 may include a controller, which may comprise a microprocessor and/or microcontroller and/or FPGA (Field-Programmable Gate Array) device and/or ASIC (Application Specific Integrated Circuit) device. It may be considered that the processing circuitry 835 includes or may be connected or connectable to memory, which may be configured to be accessible for reading and/or writing by the controller and/or processing circuitry 835.

Figure 9:
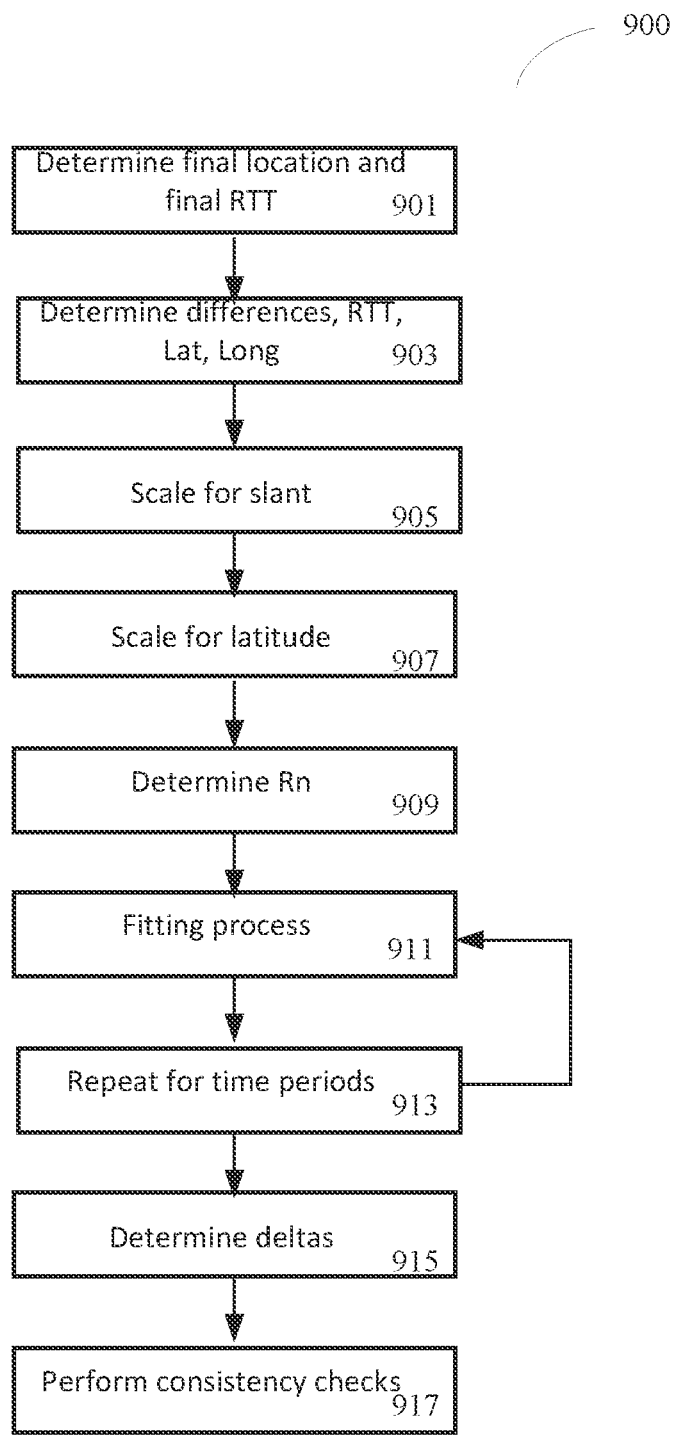
FIG. 9 is a flow diagram of an example of one embodiment of the process that calculates the position of a moving mobile station.

FIG. 9 is a flow diagram of an example of one embodiment of the process 900 that calculates the position of a moving mobile target STA 120. Process 900 may start at step 901 where the final location, latitude$_n$ and longitude$_n$, of the airborne measuring station 110, and the final RTT measurement, RTT$_n$ are determined. For example, with reference to FIG. 4, the final location of the airborne measuring station 110 is position 410, latitude Y$_n$, and longitude X$_n$, and the corresponding RTT measurement, RTT$_n$, is related to R$_n$ 430, where RTT$_n$=2 R$_n$/C. The final measurement of the latitude and longitude and RTT of the airborne measuring station 110 may also be determined over an average of a number of measurements in order to remove RTT fluctuations. For example, the average may be taken for the final 5 measurements. The latitude and longitude measurements may be derived from the GPS 840 and/or the gyro module 860. The RTT may be measured by transmitting, via RF transmitter 811, a request packet 350 and receiving, via RF receiver 812, the response packet 355, as discussed above with reference to FIG. 3. The measurement may be carried out in processor 816 and stored in memory 817. The results of the measurements may be inputted to the processing circuitry 835, via Ethernet switch 850, and stored in database 834.

In step 903, the differences between earlier measurements of the latitude, longitude RTT and RTT may be derived, together with the times of the measurements, t$_q$. Hence, for q=1 to q:

latitude$_q$=latitude$_{n-q}$–latitude$_n$ or $Y_q=Y_{n-q}-Y_n$ longitude$_q$=longitude$_{n-q}$–longitude$_n$ or $X_q=X_{n-q}-X_n$ $RTT_q=RTT_{n-q}-RTT_n$ $t_q=t_{n-q}-t_n$ These calculations may be carried out in the processing circuitry 815 and/or processing circuitry 835 and the results stored in memory 833 and or database 834.

In step 905, as discussed above with reference to equations (24), (27) and (28), the RTT measurements may be multiplied by a factor F to account for the ratio of the horizontal distance RH from the airborne measuring station 110 and the target station 120.

Hence, $R_{Hq}=RTT_q \cdot F$, where $$F = \frac{\sqrt{R_n^2 - Alt_n^2}}{R_n}$$

It may be assumed that the altitude does not change significantly over the time of the measurements, and hence, to simplify the procedure, only the final RTT is used for the correction factor F. Alternatively, each RTT measurement could be multiplied by factor F In step 907 the longitude measurement X$_q$ may be scaled by a factor to account for reduced distance per degree when not at the equator.

Hence, $X'_q=X_q \cdot COS(X_n)$

Note that the units of R$_{Hq}$ may be converted to microseconds, the units of X$_q$ and Y$_q$ to meters, and the units of time to seconds such that the speed of light C=300 m/µs, the target station 120 constant velocity v will be in m/s, and the distance r$_{n-q}$ between positions (X$_{n-q}$, Y$_{n-q}$) and (X$_n$, Y$_n$), will be in meters.

In step 909 the value for R$_n$ is determined. As discussed above with reference to FIG. 3 and equations (1) and (2), the value for R may be expressed as R=(TOA—TOD–packet length– (SIFS+delay))×C/2 where the only unknown is the "delay" which is the variation in SIFS time for any particular target station 120. A value for this delay, i.e., the effective SIFS, may have be determined by previous location calculations when the target station 120 was stationary. However, observation of equations (13) and (24) indicates that ΔRTT is not that sensitive to absolute R and a deviation of perhaps 10% is not critical, In step 911 a minimization of the summation of squared residuals, SSR, fitting process, such as Levenberg-Marquardt may be used to determine the parameters α, v$_N$ and v$_E$ that minimize the residual, (R$_H$–ΔRTT)$^2$ where ΔRTT is given by equations (24), (27) and (28). Alternatively, the minimization of the SSR fitting process may use the "Pass Filter" function as described in U.S. Patent Application Publication No: US 2021/0302566.

In step 913, for a final location, i.e., latitudes and longitude$_n$, of the airborne measuring station 110, and the final RTT measurement, RTT$_n$, step 911 may be repeated using varying time spans in the past. For example, data from time spans of 30 to 90 seconds in the past may be used until there is sufficient data such that the correlation matrix used in the fitting process indicates a sufficiently small uncertainty in α 440, for example, ±5 degrees or 1/10 radians. The target station velocities, v$_N$ and v$_E$ are included in the fitting process in order to get a valid value for angle α 440 and the corresponding target station 120 velocity, v, where v= $\sqrt{v_N^2+v_E^2}$ may be used to predict a future location of the target station 120.

In step 915 the uncertainties in a and R are determined. The target station 120 location may be boxed by α±Δα, and by R±ΔR, where ΔR is related to the uncertainty in SIFS time as discussed above in step 907, i.e., "delay"×C. Here, α and Δα may be derived from the correlation matrix of a successful fitting process as discussed above with respect to step 913.

In step 917, consistency checks may be performed with previous measurements in order to gain confidence that the assumption of the model, i.e., that the effect of the target station 120 velocity over time can be replaced by an average velocity, is valid.

Figure 10:
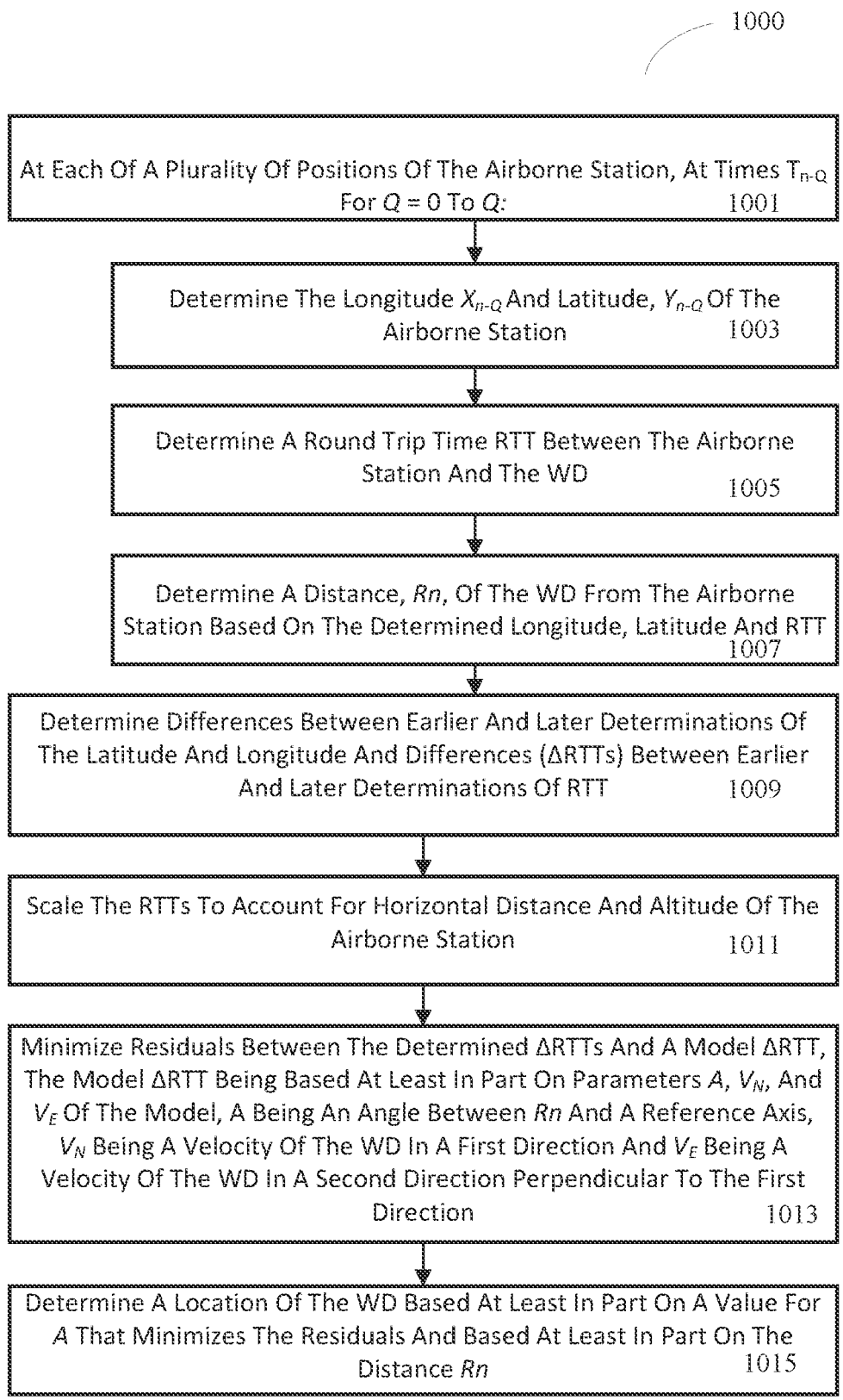
FIG. 10 is a flow diagram of another example process for determining the position of a moving mobile station.

FIG. 10 is a flowchart 1000 of an example process in an airborne station 110, performed by processing circuitry 835 for determining a location of a WD. In step 1001, at each of a plurality of positions of the airborne station, at times $t_{n-q}$ for q=0 to q, the following are determined: the longitude $X_{n-q}$ and latitude, $Y_{n-q}$ of the airborne station (Step 1003); a round trip time RTT between the airborne station and the WD (Step 1005); and a distance, $R_n$, of the WD from the airborne station based on the determined longitude, latitude and RTT (Step 1007). In Step 1009, the airborne station determines differences between earlier and later determinations of the latitude and longitude and differences (ΔRTTs) between earlier and later determinations of RTT. In Step 1011, the airborne station scales the RTTs to account for horizontal distance and altitude of the airborne station. In Step 1013, the airborne station minimizing residuals between the determined ΔRTTs and a model ΔRTT, the model ΔRTT being based at least in part on parameters α, $v_N$, and $v_E$ of the model, a being an angle between $R_n$ and a reference axis, $v_N$ being a velocity of the WD in a first direction and $v_E$ being a velocity of the WD in a second direction perpendicular to the first direction. In Step 1015, the airborne station determines a location of the WD based at least in part on a value for a that minimizes the residuals and based at least in part on the distance $R_n$.

In some embodiments, the model ΔRTT is based at least in part on:

$$\Delta RTT = \left(\frac{2R_n}{C}\right)\left\{\sqrt{\left(1+\frac{d_{n-q\ para}}{Rn}\right)^2 + \left(\frac{d_{n-q\ perp}}{Rn}\right)^2} - 1\right\}$$

where $d_{n-q\ para}$=COS(α)Δ$r_N$+SIN(α)Δ$r_E$+[COS(α) $v_N$+SIN(α)$v_E$]*$(t_n-t_{n-q})$;

|$d_{n-q\ perp}$|=|-SIN(α) Δ$r_N$+COS(α) Δ$r_E$+[-SIN(α) $v_N$+COS(α) $v_E$]*$(t_n-t_{n-q})$|; and Δ$r_N$ is a change in latitude of the WD; Δ$r_E$ is a change in longitude of the WD and C is a speed of light. In some embodiments, values of $v_N$ and $v_E$ that minimize the residuals are used to predict an average velocity $v=\sqrt{V_N^2+V_E^2}$ of WD and a future location of the WD. In some embodiments, the WD location is boxed by α±Δα, and by R±ΔR, where ΔR is related to an uncertainty in short interface spacing (SIFS) time and where α and Δα are derived from a correlation matrix based on the model. In some embodiments, the RTTs are scaled by a factor given by $$F = \frac{\sqrt{R_n^2 - Alt_n^2}}{R_n};$$

where $Alt_n$ is an altitude of the airborne station and $R_n$ is the range in the same units as the altitude. In some embodiments, the residuals are minimized based at least in part on minimizing a sum of squared residuals. In some embodiments, the process further includes scaling the longitude $X_{n-q}$ by COS ($Y_{n-q}$). In some embodiments, a measure of a final value of an RTT is based at least in part on an average of a number predetermined RTTs. In some embodiments, Rn is determined based at least in part on a delay that is determined when the WD is stationary. In some embodiments, the residuals are based at least in part on a horizontal distance between the WD and the airborne station.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the details of the fitting process, the time spans used to gather data, the accepted errors used in the fitting process, the corrections for latitude and slope, the orbit or path of the airborne measuring station, the frequency of the transmission of the ranging packets, the timing accuracy, and the type of packets used. Accordingly, the scope should be determined not by the embodiments illustrated, but by the claims and their legal equivalents.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in an airborne station for determining a location of a moving ground-based wireless device (WD), the method comprising:
at each of a plurality of positions of the airborne station, at times $t_{n-q}$ for q=0 to q:
determining the longitude $X_{n-q}$ and latitude, $Y_{n-q}$ of the airborne station;
determining a round trip time RTT between the airborne station and the WD;
determining a distance, Rn, of the WD from the airborne station based at least in part on the determined longitude, latitude and RTT;
determining differences between earlier and later determinations of the latitude and longitude and differences (ΔRTTs) between earlier and later determinations of RTT;
scaling the RTTs to account for horizontal distance and altitude of the airborne station;
minimizing residuals between the determined ΔRTTs and a model ΔRTT, the model ΔRTT being based at least in part on parameters α, $v_N$, and $v_E$ of the model, α being an angle between Rn and a reference axis, $v_N$ being a velocity of the WD in a first direction and $v_E$ being a velocity of the WD in a second direction perpendicular to the first direction; and
determining a location of the WD based at least in part on a value for a that minimizes the residuals and based at least in part on the distance Rn, the WD location being boxed by α±Δα, and by R±ΔR, ΔR being related to an uncertainty in short interface spacing (SIFS) time and where α and Δα are derived from a correlation matrix based on the model.

2. The method of claim 1, wherein the model ΔRTT is based at least in part on:

$$\Delta RTT = \left(\frac{2R_n}{C}\right)\left\{\sqrt{\left(1 + \frac{d_{n\text{-}q\ para}}{Rn}\right)^2 + \left(\frac{d_{n\text{-}q\ perp}}{Rn}\right)^2} - 1\right\}$$

where $d_{n-q\ para}$=COS(α) $\Delta r_N$+SIN(α) $\Delta r_E$+[COS(α) $v_N$+SIN(α) $v_E$]*$(t_n-t_{n-q})$;
$|d_{n-q\ perp}|$=|−SIN(α) $\Delta r_N$+COS(α) $\Delta r_E$+[−SIN(α) $v_N$+COS(α) $v_E$]*$(t_n-t_{n-q})$|
$\Delta r_N$ is a change in latitude of the WD; $\Delta r_E$ is a change in longitude of the WD and C is a speed of light.

3. The method of claim 1, wherein values of $v_N$ and $v_E$ that minimize the residuals are used to predict an average velocity $v=\sqrt{v_N^2+v_E^2}$ of WD and a future location of the WD.

4. The method of claim 1, wherein the RTTs are scaled by a factor given by $$F = \frac{\sqrt{R_n^2 - Alt_n^2}}{R_n};$$

where $Alt_n$ is an altitude of the airborne station.

5. The method of claim 1, wherein the residuals are minimized based at least in part on minimizing a sum of squared residuals.

6. The method of claim 1, wherein a measure of a final value of an RTT is based at least in part on an average of a number predetermined RTTs.

7. The method of claim 1, wherein Rn is determined based at least in part on a delay that is determined when the WD is stationary.

8. The method of claim 1, wherein the residuals are based at least in part on a horizontal distance between the WD and the airborne station.

9. An airborne station for determining a location of a moving ground-based wireless device (WD), the airborne station comprising processing circuitry configured to:
at each of a plurality of positions of the airborne station, at times $t_{n-q}$ for q=0 to q:
determine the longitude $X_{n-q}$ and latitude, $Y_{n-q}$ of the airborne station;
determine a round trip time RTT between the airborne station and the WD;
determine a distance, $R_n$, of the WD from the airborne station based at least in part on the determined longitude, latitude and RTT;
determine differences between earlier and later determinations of the latitude and longitude and differences (ΔRTTs) between earlier and later determinations of RTT;
scale the RTTs to account for horizontal distance and altitude of the airborne station;
minimize residuals between the determined ΔRTTs and a model ΔRTT, the model ΔRTT being based at least in part on parameters α, $v_N$, and $v_E$ of the model, a being an angle between $R_n$ and a reference axis, $v_N$ being a velocity of the WD in a first direction and $v_E$ being a velocity of the WD in a second direction perpendicular to the first direction; and
determine a location of the WD based at least in part on a value for a that minimizes the residuals and based at least in part on the distance Rn, the WD location being boxed by $\alpha \pm \Delta\alpha$, and by $R \pm \Delta R$, $\Delta R$ being related to an uncertainty in short interface spacing (SIFS) time and where $\alpha$ and $\Delta\alpha$ are derived from a correlation matrix based on the model.

10. The airborne station of claim 9, wherein the model $\Delta RTT$ is based at least in part on:

$$\Delta RTT = \left(\frac{2R_n}{C}\right)\left\{\sqrt{\left(1+\frac{d_{n-q\ para}}{Rn}\right)^2 + \left(\frac{d_{n-q\ perp}}{Rn}\right)^2} - 1\right\}$$

where $d_{n-q\ para} = \text{COS}(\alpha)\Delta r_N + \text{SIN}(\alpha)\Delta r_E + [\text{COS}(\alpha)v_N + \text{SIN}(\alpha)v_E]^*(t_n - t_{n-q})$;

$|d_{n-q\ perp}| = |-\text{SIN}(\alpha)\,\Delta r_N + \text{COS}(\alpha)\,\Delta r_E + [-\text{SIN}(\alpha)\,v_N + \text{COS}(\alpha)\,v_E]^*(t_n - t_{n-q})|$ $\Delta r_N$ is a change in latitude of the WD; $\Delta r_E$ is a change in longitude of the WD and C is a speed of light.

11. The airborne station of claim 9, wherein values of $v_N$ and $v_E$ that minimize the residuals are used to predict an average velocity $v = \sqrt{v_N^2 + v_E^2}$ of WD and a future location of the WD.

12. The airborne station of claim 9, wherein the RTTs are scaled by a factor given by $$F = \frac{\sqrt{R_n^2 - Alt_n^2}}{R_n};$$

where $Alt_n$ is an altitude of the airborne station.

13. The airborne station of claim 9, wherein the residuals are minimized based at least in part on minimizing a sum of squared residuals.

14. The airborne station of claim 9, wherein a measure of a final value of an RTT is based at least in part on an average of a number predetermined RTTs.

15. The airborne station of claim 9, wherein Rn is determined based at least in part on a delay that is determined when the WD is stationary.

16. The airborne station of claim 9, wherein the residuals are based at least in part on a horizontal distance between the WD and the airborne station.

* * * * *